R. B. & P. WRIGHT.
Hay-Rake and Baling-Press.

No. 205,026. Patented June 18, 1878.

WITNESSES:
C. Neveux
E. Sedgwick

INVENTOR:
R. B. Wright
P. Wright
BY
Munn & Co
ATTORNEYS.

R. B. & P. WRIGHT.
Hay-Rake and Baling-Press.
No. 205,026. Patented June 18, 1878.
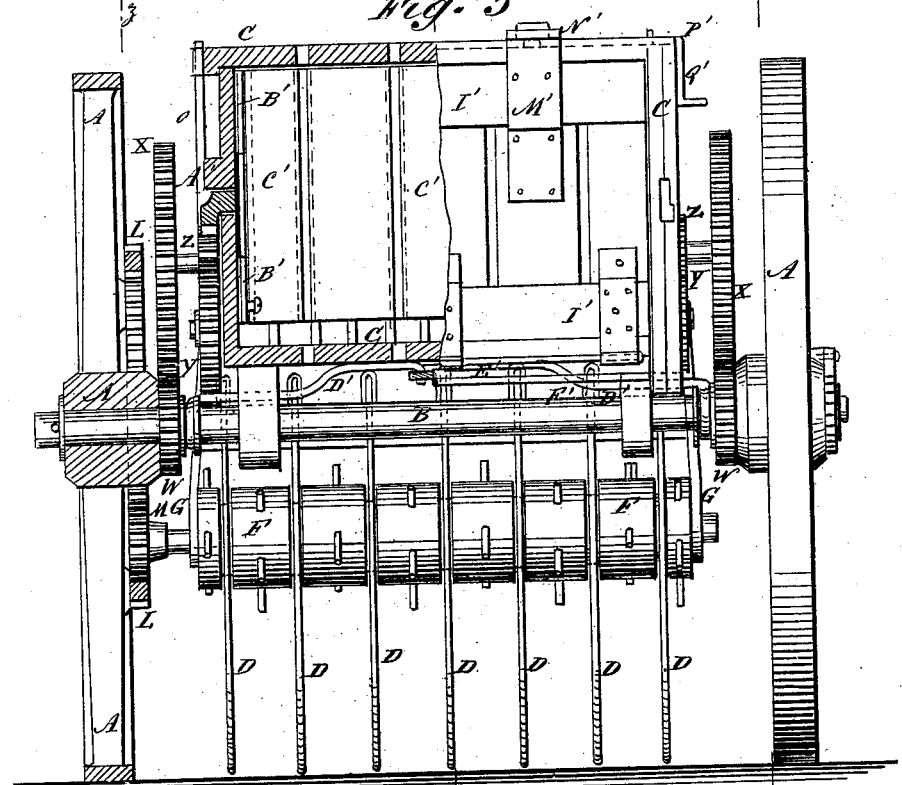
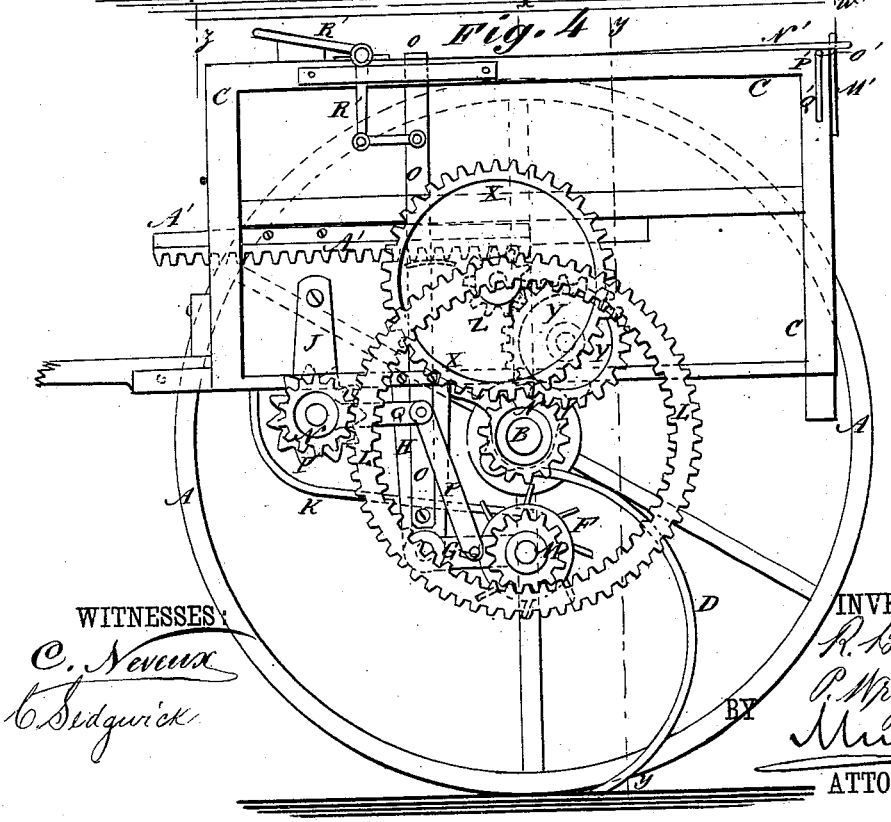

3 Sheets—Sheet 3.

R. B. & P. WRIGHT.
Hay-Rake and Baling-Press.

No. 205,026. Patented June 18, 1878.

WITNESSES:
C. Neveux
C. Sedgwick

INVENTOR:
R. B. Wright
P. Wright
BY Munn & Co
ATTORNEYS.

UNITED STATES PATENT OFFICE.

ROBERT B. WRIGHT AND PARVIN WRIGHT, OF ROCK CREEK, WYOMING TER.

IMPROVEMENT IN HAY-RAKE AND BALING-PRESS.

Specification forming part of Letters Patent No. 205,026, dated June 18, 1878; application filed May 6, 1878.

*To all whom it may concern:*

Figure 1:
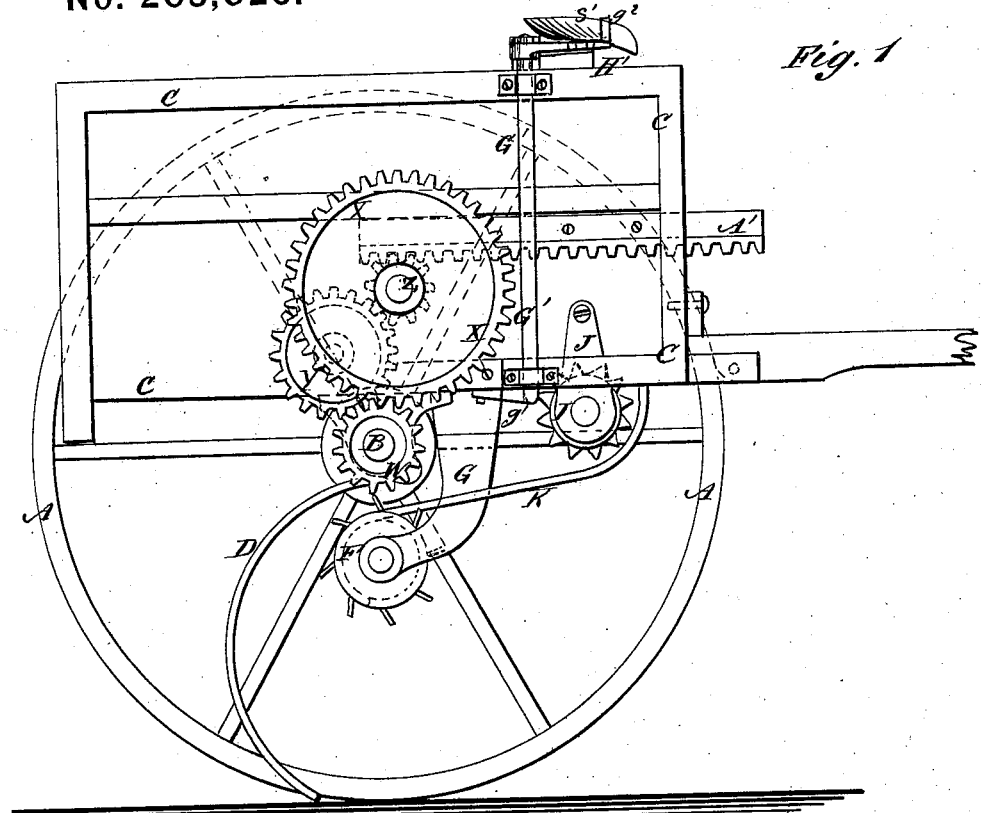
Figure 2:
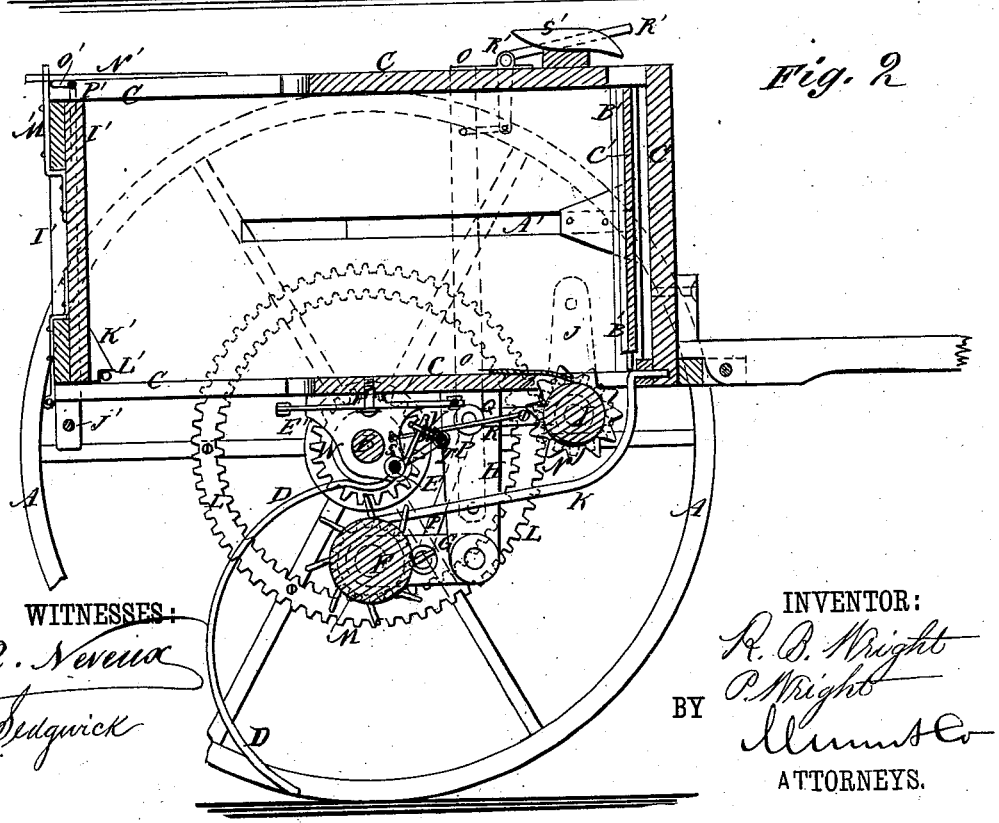
Figure 5:
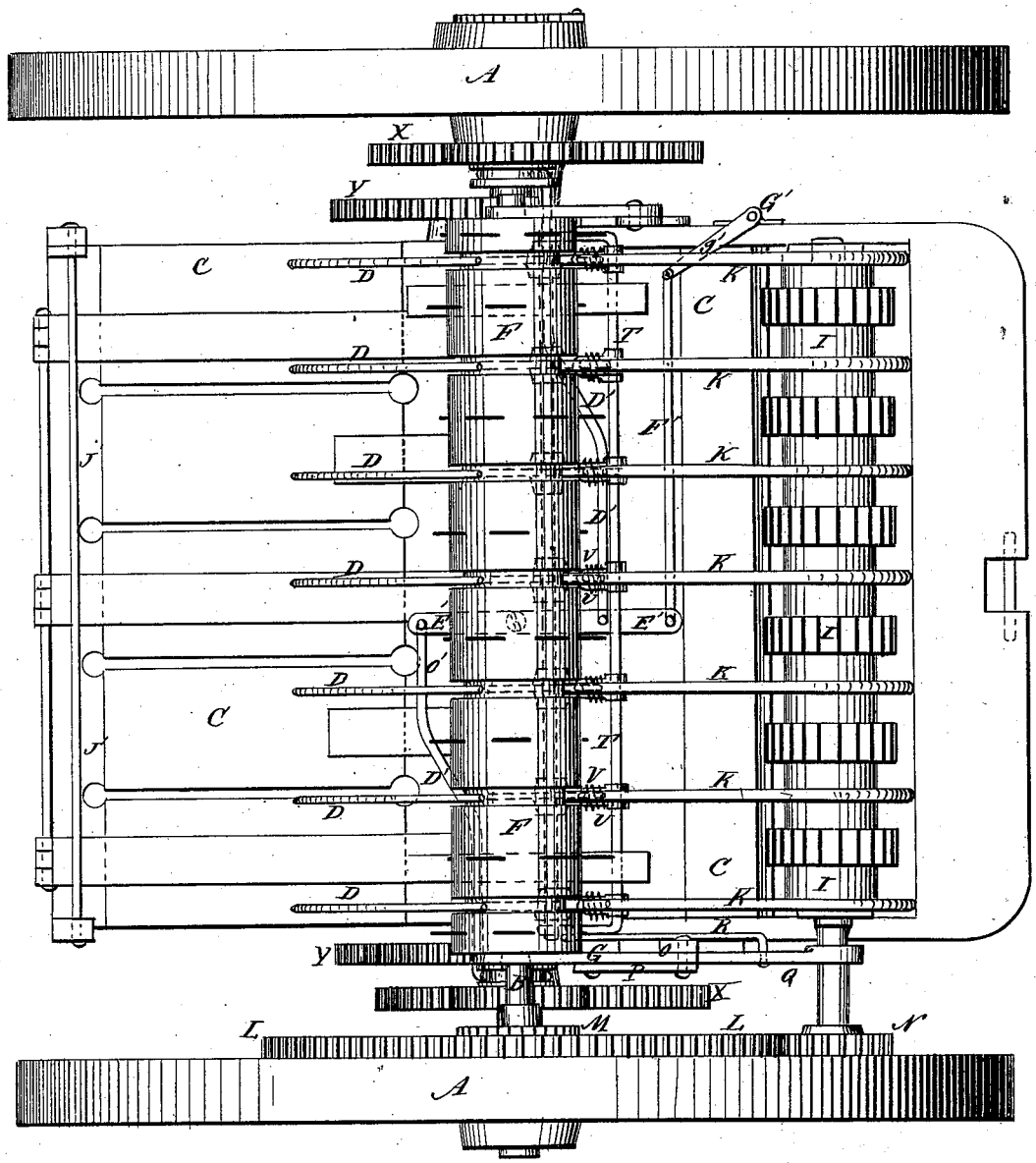
Figure 6:
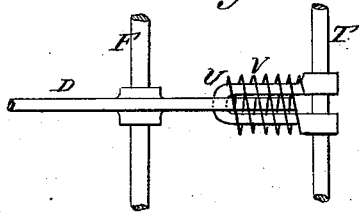

Be it known that we, ROBERT B. WRIGHT and PARVIN WRIGHT, of Rock Creek, in the county of Albany, Wyoming Territory, have invented a new and useful Improvement in Combined Hay-Rake and Baling-Press, of which the following is a specification:

Figure 1, Sheet 1, is a side view of our improved machine, partly in section, through the line *w w*, Fig. 3. Fig. 2, Sheet 1, is a vertical longitudinal section of the same, taken through the line *x x*, Fig. 3. Fig. 3, Sheet 2, is a rear view of the same, partly in section, through the line *y y*, Fig. 4. Fig. 4, Sheet 2, is a side view of the other side of the machine, partly in section, through the line *z z*, Fig. 3. Fig. 5, Sheet 3, is an under-side view of the same. Fig. 6, Sheet 3, is a detail view of the upper part of one of the rake-teeth and its attachments.

Similar letters of reference indicate corresponding parts.

The object of this invention is to furnish an improved machine which shall be so constructed as to collect the hay and press it into bales while being drawn forward through the meadow, and which at the same time shall be convenient in use and reliable in operation.

The invention consists in the combination of the rake-teeth, the guide-apron or platform, the two toothed cylinders, and the baling-box with each other and the wheels and axle; in the combination of the internally and externally toothed gear-wheel, and the gear-wheels with the drive-wheel, and the two toothed cylinders; in the combination of the lever and the pivoted bars with the two toothed cylinders, for throwing the gear-wheels into and out of gear with the main gear-wheel; in the combination of the short arm or lever and the connecting-rod with the bar that supports the rake-teeth and the lever, for raising the said rake-teeth when the gear-wheels are thrown out of gear; in the combination of the follow-block, the toothed racks, and the gear-wheels with the baling-box and the axle of the drive-wheels, for compressing the bale; in the combination of the three connecting-bars and the two levers with the sliding-gear wheels, the axle, and the baling-box; and in the combination of the bars, the pins, the rod, the spring-fasteners, the cams or arms, and the rod with the hinged end board, the hinged part of the baling-box bottom, and the said baling-box, as hereinafter fully described.

A are two wheels, which revolve upon the journals of the axle B, and one or both of which are connected with said axle by pawls and ratchet-wheels, so that they may carry the said axle with them in their revolution. The axle B revolves in bearings attached to the bottom of the baling-box C. D are the rake-teeth, which are made of steel wire, bent into the proper shape, and the upper parts of which are coiled around or otherwise connected with a rod, E, which is attached to the bearings of the axle B or other suitable supports. Beneath the upper part of the rake-teeth D is placed a cylinder, F, to the surface of which is attached a number of teeth, and the journals of which revolve in bearings in the rear ends of the arms G, the upper end of one of which is attached to the baling-box C. The forward end of the other arm G is pivoted to the lower end of the arm H, the upper end of which is attached to the side of the baling-box C. Beneath the forward part of the baling-box C is placed a cylinder, I, which is also toothed, and the journals of which revolve in bearings in the lower ends of the bars J, the upper ends of which are pivoted to the sides of the forward part of the baling-box C. K is an apron or platform, the rear end of which rests upon or is supported near the upper side of the cylinder F, and its forward part is curved upward, so as to pass around the forward side of the toothed cylinder I, and its upper end is attached to the forward end of the baling-box C. The apron or platform K may be formed of rods, in which case their rear ends may rest in grooves in the cylinder F; or it may be formed of sheet metal, in which case its rear part should be slotted, to allow the teeth of the cylinder F to pass freely. The bottom of the baling-box C, above the space between the upper end of the apron or platform K and the forward toothed cylinder I, is slotted transversely, as shown in Fig. 2.

By this construction, as the machine is drawn forward the rake-teeth D gather the hay, which is carried by the toothed cylinder F to the platform K, along which it passes to the toothed cylinder I, and is forced by said cylinder I through the slot in the bottom of the baling-box into the interior of said box. To one of the drive-wheels A is attached a ring gear-wheel, L, which has teeth formed upon its inner and outer edges, as shown in Figs. 2 and 4. Into the inner teeth of the gear-wheel L mesh the teeth of the gear-wheel M, attached to the end of the toothed cylinder F. Into the outer teeth of the gear-wheel L mesh the teeth of the gear-wheel N, attached to the end of the toothed cylinder I, so that the said cylinders F I may be revolved by the advance of the machine. O is a lever, which passes up along the side of the baling-box C, and the lower end of which is pivoted to the lower part of the bar H, that supports the bar G of the toothed cylinder F. To the lever O, at a little distance above its pivoting-point, is pivoted the upper end of the bar P, the lower end of which is pivoted to the bar G, that connects the toothed cylinder F with the bar H. To the lever O is also pivoted the rear end of a bar, Q, the forward end of which rides upon a journal of the toothed cylinder I. By this construction, by operating the lever O the gear-wheels M N may be thrown into and out of gear with the gear-wheel L, when desired. To the pivoted bar Q is pivoted the forward end of a bar or rod, R, the rear end of which is pivoted to the outer end of a short lever, S, formed upon or attached to the rod E, that supports the rake-teeth D. With the rod E, or with the lever S, is rigidly connected a rod, T, to which are attached as many staples or loops U as there are rake-teeth D.

The upper ends of the rake-teeth D are extended, as shown in Fig. 2, so as to pass through the loops or staples U. Around the loops U, between the ends of the rake-teeth D and the rod T, are placed spiral springs V, by the action of which the upper ends of the rake-teeth D are held up, holding their lower ends down upon the ground in such a way that they may yield independently of each other should either of them strike an obstruction. By this arrangement, by operating the lever O to throw the gear-wheels M N into and out of gear with the gear-wheel L, the rake-teeth D will at the same time and by the same movement be raised from and lowered to a working position.

Upon the axle B, at the inner sides of the wheels A, are placed two gear-wheels, W, which are connected with said axle by keys or other means, so that they may be carried around by and with the axle B in its revolution, and at the same time may be slid upon said axle to throw them into gear with the gear-wheels X or Y, as may be desired. The gear-wheels X are made large, and are rigidly connected with the small gear-wheels Z, which are pivoted to the middle part of the sides of the baling-box C. The gear-wheels Y are made smaller, are pivoted to the lower part of the sides of the baling-box C, and their teeth mesh into the teeth of the gear-wheels Z. Into the teeth of the gear-wheels Z mesh the teeth of the rack-bars A', which slide in slots in the sides of the baling-box C, and to the inner sides of which are secured upright holders B', which are grooved upon their inner sides to receive a head or follow block, C'. By this construction, when the gear-wheels W are thrown into gear with the gear wheels X, the gear-wheels Z will be turned, and the rack-bars A' will be drawn toward the rear end of the baling-box C, carrying the follow-block C' with them, and compressing the hay into a bale.

When the bale has been removed by throwing the gear-wheels W into gear with the gear-wheels Y, the gear-wheels Z will be turned in the other direction, drawing back the rack-bars A'; but in this case the follow-block C' should be removed before the motion of the rack-bars A' is changed. The follow-block C' is removed through the rear end of the baling-box C, and is inserted in place through a slot in the forward end of the top of the said baling-box when enough hay has been forced into the said baling-box to form a bale.

When the gear-wheels W are adjusted midway between the gear-wheels X Y they will be out of gear with both of said wheels, and the rack-bars A' will stand still. With grooves formed upon the inner ends of the hubs of the gear-wheels W are connected the outer ends of the connecting-bars D', the inner ends of which are pivoted to the lever E' upon the opposite sides of and equally distant from its pivoting-point. To one end of the lever E' is pivoted the end of a connecting-rod, F', the other end of which is pivoted to an arm, $g^1$, attached to the lower end of the rock-shaft G', to the upper end of which is attached a crank-arm, $g^2$, which moves along the edge of the notched plate H', attached to the top of the baling-box C, so that by adjusting the crank-arm $g^2$ in one or the other of the three notches formed in it, the gear-wheels W may be locked in either of the three positions into which they may be adjusted.

The rear part of the bottom of the baling-box C is loose, and is hinged at its forward edge to the stationary part of said bottom, and to its rear edge is hinged the rear end-board I'. The hinged part of the baling-box bottom is kept from dropping down too far by a rod, J', attached to the downwardly-projecting ends of the rear corner-posts of the baling-box C.

To the lower corners of the end-board I' are attached arms or plates K', which project inward, so that when the said end-board is turned up upon its hinges the said plates or arms K' may strike upon pins L', attached to the lower part of the sides of the baling-box, and draw the hinged part of the baling-box bottom up into a horizontal position.

To the upper part of the end-board I' are attached bars M', the upper ends of which pass through holes in the plates N', attached to the top of the baling-box, and the rear ends of which project in the rear, so as to receive the upper ends of the said bars or plates M'. The spring-plates N' are raised to allow the end-board I' to be opened by arms or cams O', attached to a rod, P', which is let into a groove in the top of the baling-box C, and to one end of which is attached or upon it is formed a crank, Q', for convenience in operating it to raise the plates N', and thus unfasten the end-board I'. The lever O may be operated directly by taking hold of its upper end; or a bent lever, R', may be connected with it and extended into such a position that it may be conveniently reached and operated by the driver from his seat S', attached to the top of the baling-box.

The inner sides of the follow-block C' and of the end-board I' are grooved, and the rear part of the top and bottom of the baling-box C is slotted, to allow bands to be conveniently passed around the bale while compressed.

To remove the bale from the baling-box, the end-board I' is unfastened and allowed to drop down, which lowers the rear part of the baling-box bottom into a slightly-inclined position, so that the compressed bale will readily slide out.

Having thus described our invention, what we claim as new, and desire to secure by Letters Patent, is—

1. The combination of the rake-teeth D, the guide-apron or platform K, the two toothed cylinders F I, and the baling-box C with each other and the wheels and axle A B, substantially as herein shown and described.

2. The combination of the internally and externally toothed gear-wheel L and the gear-wheels M N with the drive-wheel A and the two toothed cylinders F I, substantially as herein shown and described.

3. The combination of the lever O and the pivoted bars P Q with the two toothed cylinders F I, for throwing the gear-wheels M N into and out of gear with the gear-wheel L, substantially as herein shown and described.

4. The combination of the short arm or lever S and the connecting-rod R with the bar E, that supports the rake-teeth D, and the lever O, for raising the said rake-teeth when the gear-wheels M N are thrown out of gear, substantially as herein shown and described.

5. The combination of the follow-block C', the holders B', the toothed racks A', and the gear-wheels W X Y Z with the baling-box C and the axle B of the drive-wheels A, for compressing the bale, substantially as herein shown and described.

6. The combination of the three connecting-bars D' D' F' and the two levers E' G' with the sliding gear-wheels W and axle B and the baling-box C, substantially as herein shown and described.

7. The combination of the bars or arms K', the pins L', the rod J', the spring-fasteners M' N', the cams or arms O', and the rod P' with the hinged end-board I', the hinged part of the baling-box bottom, and the baling-box C, substantially as herein shown and described.

ROBERT B. WRIGHT.
PARVIN WRIGHT.

Witnesses:
HERBERT THAYER,
HENRY E. SWEETSER.